United States Patent [19]
An et al.

[11] Patent Number: 5,831,082
[45] Date of Patent: Nov. 3, 1998

[54] PROCESS FOR OBTAINING, BY SEPARATION, HIGHLY PURE WATER-SOLUBLE POLYDEXTROSE

[75] Inventors: Se Cheon An; Ho Soon Jee, both of Ansan; Moo Hoe Doh, Seoul, all of Rep. of Korea

[73] Assignee: Shin Dong Bang Corporation, Seoul, Rep. of Korea

[21] Appl. No.: 733,316

[22] Filed: Oct. 17, 1996

[30] Foreign Application Priority Data

May 28, 1996 [KR] Rep. of Korea ............ 96-18133

[51] Int. Cl.⁶ .................. C07H 1/06; C07H 1/00
[52] U.S. Cl. ............... 536/127; 536/124; 536/123.1; 127/46.2; 127/53
[58] Field of Search .................. 536/127, 124, 536/123.1; 127/46.2, 53

[56] References Cited

U.S. PATENT DOCUMENTS

| | | | |
|---|---|---|---|
| 3,766,165 | 10/1973 | Rennhard | 260/209 |
| 3,876,794 | 4/1975 | Rennhard | 426/152 |
| 4,022,637 | 5/1977 | Stutthoff et al. | 127/46 |
| 4,622,233 | 11/1986 | Torres | 426/548 |
| 4,948,596 | 8/1990 | Bunick et al. | 426/3 |
| 4,956,458 | 9/1990 | Luo et al. | 536/127 |
| 5,091,015 | 2/1992 | Bunick et al. | 127/46.2 |
| 5,601,863 | 2/1997 | Borden et al. | 536/112 |

FOREIGN PATENT DOCUMENTS 473 333  3/1992  European Pat. Off.

OTHER PUBLICATIONS

Denpun Kagaku, vol. 36, No. 1 "Distribution and Dispersion . . ." Adachi et al, pp. 21–24, 1989.

Zucker Industrie, vol. 117, No. 11, "Production of Raffinose: A New Byproduct of . . .", Sayama et al, pp. 893–898, 1992.

Journal of Chemical Engineering of Japan, vol. 16, No. 5, "Models for the Separation of Glucose . . .", Hashimoto et al, 1983.

Primary Examiner—John Kight
Assistant Examiner—Everett White
Attorney, Agent, or Firm—Jacobson, Price, Holman & Stern, PLLC

[57] ABSTRACT

A process for obtaining, by separation, highly pure, water soluble polydextrose using a continuous simulated moving bed system. The process involves separation from a crude polydextrose mixture containing 75–95 wt % polyglucose, 2–10 wt % glucose, 1–5 wt % anhydroglucose, 1–5 wt % sorbitol and 0.5–3 wt % citric acid. The highly pure, i.e., over 99.2%, water soluble polydextrose obtained by this process can be used as a low calorie sweetener in diet foods and drinks and does not have a bitter after taste.

3 Claims, 3 Drawing Sheets

A: Feed solution reservoir
B: Desorbent water reservoir
C: Circulation pump 1
D: Circulation pump 2
E: Collector component A (Highly pure polydextrose)
D: Collector component B (Monomers)

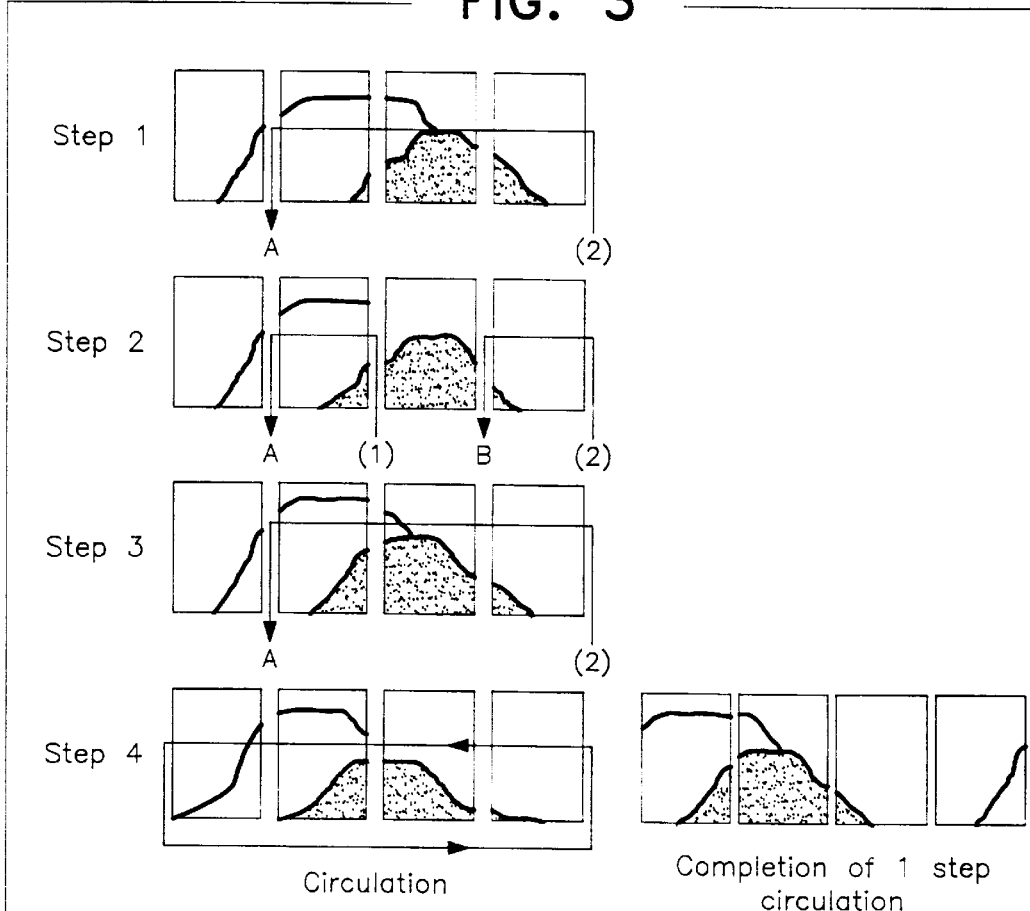

PROCESS FOR OBTAINING, BY SEPARATION, HIGHLY PURE WATER-SOLUBLE POLYDEXTROSE

The present invention relates to a process for obtaining, by separation, highly pure, water-soluble polydextrose using continuous simulated moving bed system. More particularly, the present invention relates to a process for obtaining, by separation, highly pure water-soluble polydextrose from a mixture comprising 70~95 wt % of polyglucose, 2~10 wt % of glucose, 2~10 wt % of anhydroglucose, 1~5 wt % of sorbitol, 0.5~3 wt % of citric acid.

BACKGROUND OF THE INVENTION

A water-soluble polydextrose is a kind of polysaccharide complex characterized by branched glucose polymer having β-1,6 and β-1,4 linkage of M.W. 1,500~18,000, also an item of commerce approved as additive. This water-soluble polydextrose can be applied to various kinds of food, for example, diet drink, confectionery, candy, gum, ice cream, jam, jelly margarine, ham, sausage and the likes. Furthermore, the low calorie of polydextrose(1 Cal per 1 gram) can be used for diet food, since the polydextrose is not hydrolyzed by human digestive enzyme, but fermented only by bacteria in the large intestine.

Water-soluble polydextrose has been manufactured by melting and heating glucose in the presence of 5~15 wt % of sorbitol and a catalytic amount of citric acid as disclosed in U.S. Pat. Nos. 3,766,165 and 3,876,794. However, the polydextrose manufactured by the above disclosed processes has a sour and bitter taste, as indicated in U.S. Pat. No. 4,622,233, and therefore there are limits to the amounts that can be used in food.

To solve the above problems, U.S. Pat. No. 4,622,233 disclosed a method for reducing the color, glucose content and anhydroglucose content of polydextrose using a bleaching agent selected from the group consisting of hydrogen peroxide, benzoyl peroxide and sodium chlorite. Furthermore, EP 0 473,333 A2 disclosed a process for preparing water-soluble polydextrose containing 0.3 mol percent or less of citric acid by passing an aqueous solution of unimproved highly-branched polydextrose through one or more resins selected from the group consisting of an adsorbent resin, a basic ion exchange resin and a cation exchange resin.

However, the polydextrose prepared by the method disclosed in U.S. Pat. No. 4,622,233 has a possibility to be included in the bleaching agent which is harmful to the human body. The polydextrose prepared by the method disclosed in EP 0 473,333 A2 cannot be fully purified due to only removal of citric acid.

It is therefore an object of the present invention to provide a process for obtaining, by separation, highly pure, water-soluble polydextrose from a mixture comprising 75~95 wt % of polyglucose, 2~10 wt % of glucose, 2~10 wt % of anhydroglucose, 1~5 wt % of sorbitol, 0.5~3 wt % of citric acid using continuous simulated moving bed system, said process comprising the steps of a) dissolving the crude polydextrose mixture with distilled water to be 45~50 wt % of dry substance concentration at 55°~65° C.; b) feeding and circulating said crude polydextrose solution with desorbent water through the columns equipped with separation resin; c) separating and collecting the glucose, anhydroglucose, sorbitol and/or citric acid selectively using the difference of distribution coefficient; and d) collecting the highly pure, water-soluble polydextrose.

Another object of the present invention is to provide a highly pure (over 99.2 wt %) polydextrose separated from the crude, polydextrose mixture by selectively separating the glucose, anhydroglucose, sorbitol and/or citric acid.

The column used in the present invention is compacted with a strong acidic gel form of ion resin having $NA^+$ as a functional group, 4~8% of cross-linkage and a particle size of 180~250 μm. The preferred separation resins are, for example, Amberlite CG 6000, DIAION UBK-530K, Dowex M 4340 6X, PCR-833 and/or FRK 101 having $Na^+$ as a functional group.

BRIEF DESCRIPTION OF THE DRAWINGS

FIG. 3. shows schematically, a view of the four steps involved in the continuous simulated moving bed system.

DESCRIPTION OF THE PREFFERED EMBODIMENTS

The fundamental theory of the continuous simulated moving bed system of the present invention is explained as follows.

The continuous simulated bed system of the present invention is a kind of chromatography, characterized in using the difference of mobility according to the size of molecular weight by moving the adsorbent and the feed solution to the reverse direction in a constant flow rate. However, in practical application, the adsorbent is fixed in the column, whereas feed solution and desorbent water are circulated in the void volume of the adsorbent by moving the feeding position of feed solution and desorbent water to each following column.

The main characteristics of this system is that feeding and discharging position is moved whereas the adsorbent is fixed and feeding, discharging and circulation are continuously performed.

Figure 1:
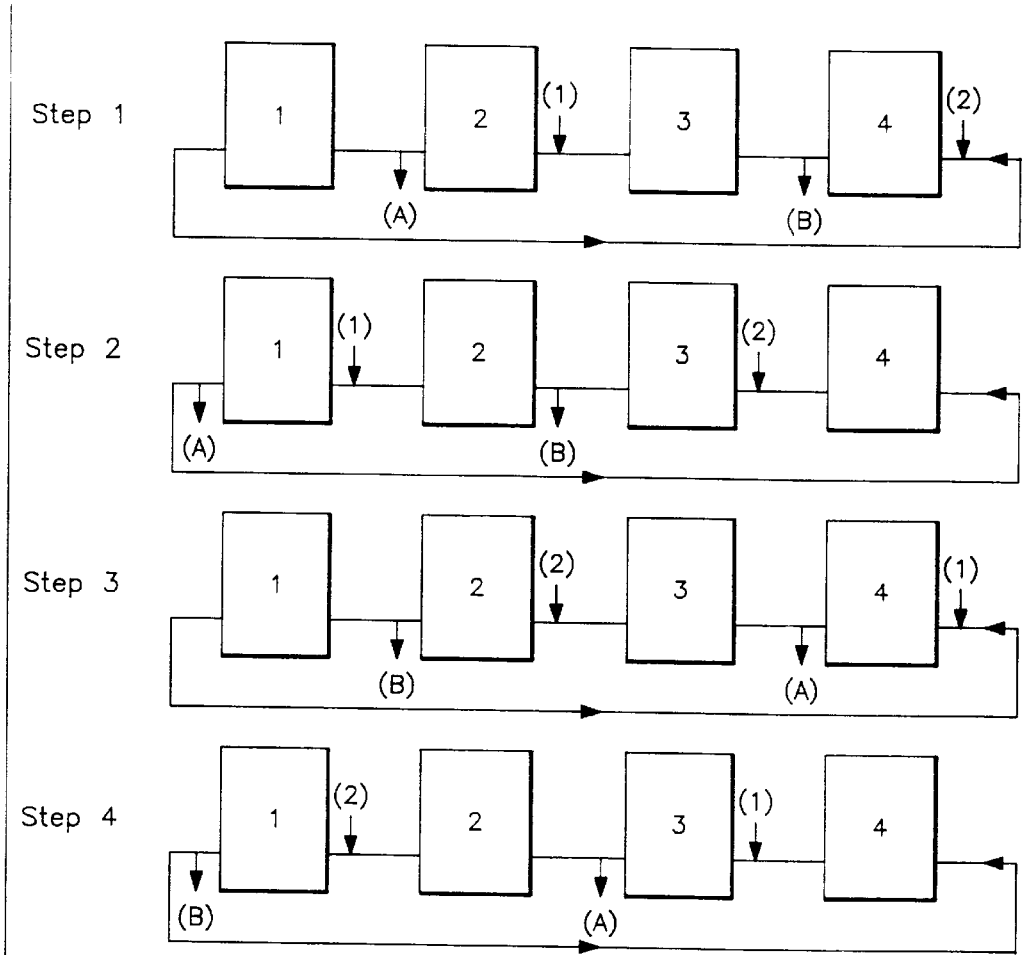
FIG. 1. shows schematically, a process of continuous simulated moving bed system of the present invention.

FIG. 1 shows the schematic process of this system, moving the feeding and discharging position in 4 steps to collect removing ingredients and highly pure polydextrose.

Figure 2:
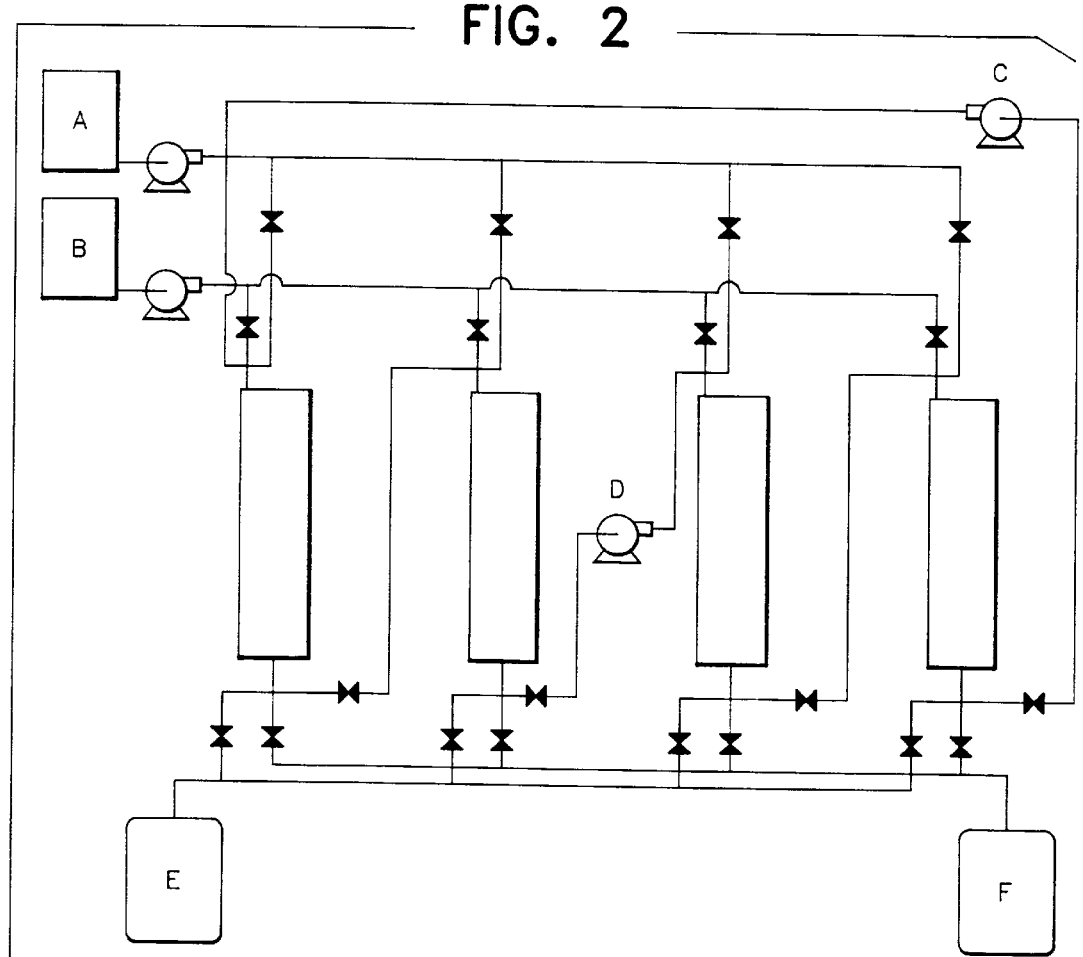
FIG. 2. shows schematically, a view of the equipment of the present invention.

The separation equipment of the present invention consists of columns having a ratio of diameter: length —4:6~2:8. The distributor is located in the upper position of the column, and the collector is located in the lower position of the column, so that the dispersion and flow of fluid is in a constant rate. The equipment consists of four columns, preferably 8~12 columns for more equipped and repeated separation. The inlets for feed solution and desorbent water are equipped at the upper part of each column, and the outlets are equipped at the lower part of each column, which are connected by a pipe to move continuously. Polydextrose collector, monomer collector and pump are also equipped. For the control of each flow rate, flow meter and automatic valve are equipped, and reservoirs are also mounted for the continuous input of feed solution and desorbent. For clear understanding, the simple structure of the equipment is illustrated in FIG. 2.

The resin as an adsorbent is a strong acidic gel form of ion resin having $Na^+$ as a functional group, 4~8% of cross-linkage and 180~250 μm of particle size. The preferred separation resins are, for example, Amberlite CG 6000, DIAION UBK-530K, Dowex M4340 6X, PCR-833 and/or FRK 100 having Na$^+$functional group. Among the above-mentioned separation resin, functional group Ca$^{+2}$ has to be substituted to Na$^+$ by reacting 5~10% NaCl solution, in case of the resin having Ca$^{+2}$ as a functional group.

In case that a feed solution is passed through the separate resin, the components of feed solution are discharged from the outlet according to the size of molecular weight from the large molecular weight to small molecular weight (M.W.). It is caused by the principle that the material having large molecular weight is passed quickly and that the material having small molecular weight is passed slowly.

The resin compacted in the column has void volume among resin particles because of their round shape. If feed solution is passed through the column, the material having large M.W. shows fast moving velocity due to short retention time in a constant void volume and the material having small M.W. shows long moving velocity due to long retention time. The velocity of the component to a certain resin can be decided according to the difference of M.W. Therefore, each unique moving velocity to each component of feed solution can be decided.

When each component is discharged with a solvent moving through the column in a constant flow rate, the volume retained in each component per adsorbent volume for a constant time is called as retention volume, which is unique in accordance with the adsorption capacity and discharging capacity of adsorbent. Thus, distribution coefficient is calculated by the following equation (1) in accordance with its property.

$$V_R = V_M + K_D K_S \quad (1)$$

$V_R$ = retention volume
$V_M$ = void volume among resin particles
$K_D$ = distribution coefficient
$K_S$ = volume of resin From the above equation, the distribution coefficient of each component in the crude polydextrose mixture can be calculated. In order to calculate the distribution coefficient of each component of crude polydextrose mixture, 75~95 wt % of crude polyglucose mixture is dissolved with distilled water to 45~50 wt % of dry substance concentration at 60° C. The components of dry substance of feed are confirmed that over DP6 (over 6 glucose unit polydextrose) 45~60 wt %; DP5 (5 glucose unit polydextrose) 8~12 wt %; DP4 7~10 wt %; DP3 6~8 wt %; DP2 6~8 wt %; anhydroglucose, 2~10 wt %; sorbitol 1~5 wt %; citric acid 0.5~3 wt %.

For the analysis of the above feed solution, HPLC having HPX-42A Aminex column (made by Waters Co.) is used. Further, Bio Red Aminex HPX-87H column is used for the analysis of citric acid.

As a result of calculating the distribution coefficient of each component in crude polydextrose mixture, the following distribution coefficients as shown in Table 1 are calculated. Further details of the experimental conditions for obtaining data are as follows.
i) Concentration of dry substance in feed solution: 47 wt %
ii) Temperature of inner column: 60° C.
iii) Flow rate: 2.5 m/R-L/HR
iv) Resin in the column: FRK 101(Na$^+$) having 8% cross-linkage
v) Volume of feed solution: 10 vol % of volume of resin

TABLE 1

Distribution coefficient of component

| Component | Chemical Equation | Molecular Weight (g/mole) | Distribution Coefficient |
|---|---|---|---|
| DP10 (10G units) | $C_{60}H_{102}O_{51}$ | 1638 | 0.390 |
| DP6 (6G units) | $C_{36}H_{62}I_{31}$ | 990 | 0.410 |
| DP2 (2G units) | $C_{12}H_{22}O_{11}$ | 342 | 0.490 |
| citric acid | $C_6H_8O_7$ | 192 | 0.531 |
| sorbitol | $C_6H_{14}O_6$ | 182 | 0.539 |
| glucose | $C_6H_{12}O_6$ | 180 | 0.551 |
| anhydroglucose | $C_6H_{10}O_5$ | 162 | 0.553 |

The moving velocity of each component using distribution coefficient can be calculated on the condition that a linear velocity of mobile phase is 2.5 m/Hr; that is, DP10 6.41 m/Hr; DP6 6.10 m/Hr; DP2 5.10 m/Hr; citric acid 4.71 m/Hr; sorbitol 4.64 m/Hr; glucose 4.54 m/Hr; anhydroglucose 4.52 m/Hr, which means that the larger molecular weight shows faster linear velocity.

Actually, it is not easy to discern the difference of moving velocity among glucose, sorbitol and anhydroglucose because of their similarity of moving velocity. To discern among them, a column over 2m has to be used to show the difference of moving velocity. For the separation of polydextrose and other components, 2 phase separation, for exmaple, between components of linear velocity over 4.71 m/Hr and components of linear velocity below 4.71 m/Hr can be designed.

The operating method for the continuous simulated moving bed system of the present invention follows.

Four columns (or 8~12 columns) are arranged in cyclic position in order to circulate the fluid, and 4 outlets, that are an inlet of feed solution, an inlet of desorbent water, an outlet of component A (highly pure water-soluble polydextrose) and an outlet of component B (glucose, anhydroglucose, sorbitol and/or citric acid) are equipped in each column. The fluid is circulated through all columns so that component A and component B are distributed in whole columns.

Feed solution and desorbent water are fed in 2 column distance in case of 4 column system (4 column distance in case of 8 column system) simultaneously, and component A is discharged from the column outlet of feed solution and component B is discharged from the column outlet of desorbent water. Component A has fast moving velocity having large M.W. whereas component B has slow moving velocity having small M.W.

After the input of each feed solution and desorbent water and the output of component A and component B, the feeding and discharging of this system is moved to the next column having 2 column distance between feed solution and desorbent water. Then, component A and component B are discharged from the columns outlet of each feed solution and desorbent water respectively. Thereafter, the feeding and discharging are moved to the next column and repeat the same procedure again.

The detailed amounts of feed solution and desorbent water for separating component A and component B are as follows.

The amount of feed solution is designed to 9.4 vol % per one column resin amount and the amount of desorbent water is designed to 15.6 vol % per one column resin amount. Then, component A is discharged in an amount of 20.1 vol % per one column resin amount, and component B is discharged in an amount 4.9 vol % per one column resin amount.

Component A and component B are discharged simultaneously, since the void volume of the resin and the pipe are already filled with fluid. After finishing feeding and discharging in one column, the feeding and discharging are moved to the next column. Therefore, it required four times feeding and discharging in case of 4 column system. It takes about 55~59 minutes for 1 cycle of operation (feeding and discharging each 4 column).

The present invention is illustrated by the following examples. However, it should be understood that the invention is not limited to the specific details of these examples.

EXAMPLE 1

The separation method for removing glucose, anhydroglucose, sorbitol, citric acid from the crude polydextrose mixture 4 columns having a diameter of 67 cm and a length of 1 m are equipped, and FRK 101 $Na^+$ type resin is compacted to the columns. Therefore, the resin volume becomes 352 L/column. As shown in FIG. 3, the system is equipped and the temperature of the feed solution and desorbent water is maintained at 60° C. together with the same temperature of the inner of the column. There are four columns, No. 1–No. 4, from the left, and 881 L/Hr of flow rate pump is equipped. The flow of fluid is circulated in the counter-clock direction from No. 4 to No. 1.

The first step is to feed 19 L of desorbent water into No. 4 by passing through No. 3, and the same amount of component A (19 L of highly pure polydextrose) is discharged in No. 2. The second step is to feed 33 L of feed solution into No. 2 column and to feed 17 L of desorbent water into No. 4, and 33 L of component A is discharged from No. 2 together with discharging of 17 L of component B (glucose, anhydroglucose, sorbitol and citric acid) from No. 4. The third step is to feed 19 L of desorbent water into No. 4 by passing through No. 3, and 19 L of component A is discharged from No. 2. The fourth step is to circulate the fluid in the columns in total volume of 135 L for 9.2 minutes. First step of operation is finished as above, and it requires 14 minutes for first step of operation.

Second step of operation includes feeding of the feed solution into No. 1 and desorbent water into No. 3 and discharging of component A and component B. The first step is to feed 19 L of desorbent water into No. 3 by passing through No. 2, and the same amount of component A (19 L of highly pure polydextrose) is discharged. The second step is to feed 33 L of feed solution into No. 1 column and to feed 17 L of desorbent water into No. 3, and 33 L of component A is discharged from No. 1 together with discharging of 17 L of component B from No. 3. The third step is to feed 19 L of desorbent water into No. 3 by passing through No. 2 and 19 L of component A is discharged from No. 1. The fourth step is to circulate the fluid in the columns in total volume of 135 L for 9.2 minutes. Second step of operation is finished as above, and it requires 14 minutes for second step of operation.

The third step of operation and the fourth step of operation are performed as the same manner of previous step of operation, only moving the feeding and discharging to the next columns. Therefore, it requires 56 minutes for total 4 steps of operation. FIG. 3 shows the schematic process of four steps of one operation.

The crude polydextrose mixture used for feed solution of this example has the composition consisting of over DP6 (over 6 glucose unit polydextrose) 50.6 wt %; DP5 11.4 wt %; DP4 9.6 wt %; DP3 7.6 wt %; DP2 7.0 wt %; glucose 6.4 wt %; sorbitol 2.8 wt %; anhydroglucose 3.9 wt %; and citric acid 0.7 wt %. The highly pure water-soluble polydextrose separated by this example has a composition consisting of over DP6 58.7 wt %; DP5 13.2 wt %; DP4 11.1 wt %; DP3 8.8 wt %; DP2 8.1 wt %; glucose 0.004 wt %; sorbitol 0.004 wt %; anhydroglucose 0.002 wt %; citric acid 0.09 wt % as component A. As component B, the mixture has a composition consisting of glucose 46.3 wt %; anhydroglucose 26.2 wt %; sorbitol 20.2 wt %; citric acid 5.0 wt %; and DP2 0.3 wt %.

As a result of this separation, 99.9 wt % of highly pure, water-soluble polydextrose is obtained, and it is concentrated and dried to obtain the highly pure, water-soluble polydextrose powder. The highly pure, water-soluble polydextrose obtained in this example removed the bitter and sour taste of water-soluble polydextrose with the reduction of calories.

EXAMPLE 2

The separation method for removing citric acid selectively in the crude polydextrose mixture.

In order to remove only citric acid selectively from the crude polydextrose mixture, the amount of feed solution is designed to 9.0 vol % per one column resin amount and the amount of desorbent water is designed to 16.6 vol % per one column resin amount. Then, component A is discharged in an amount of 20.9 vol % per one column resin amount, and component B (citric acid) is discharged in an amount of 3.1 vol % per one column resin amount.

Component A and component B are discharged simultaneously, since the void volume of the resin and pipe are already filled with fluid. After finishing the discharge of component A, 38.8 vol % of 1 column volume of resin is circulated. The total time required for 1 cycle (4 steps of operation) is 57.2 minutes on condition that linear velocity is 2.5 m/L-R/Hr.

The equipment for separating process in this example is the same as the equipment of example 1.

The first step is to feed 21.2 L of desorbent water into No. 4 by passing through No. 3, and the same amount of component A (21.2 L of highly pure polydextrose) is discharged in No. 2. The second step is to feed 31.6 L of feed solution into No. 2 column and to feed 10.9 L of desorbent water into No. 4, and 31.6 L of component A is discharged from No. 2 together with discharging of 10.9 L of component B (citric acid) from No. 4. The third step is to feed 21.2 L of desorbent water into No. 4 by passing through No. 3, and 21.2 L of component A is discharged from No. 2. The fourth step is to circulate the fluid in the columns in total volume of 136 L for 9.26 minutes. First step of operation is finished as above, and it requires 14.3 minutes for first step of operation.

The second step of operation, third step of operation and the fourth step of operation are performed as the same manner of first step of operation, only moving the feeding and discharging to the next columns. Therefore, it requires 57.2 minutes for total 4 steps of operation.

The crude polydextrose mixture used for feed solution of this example has the composition consisting of over DP6 (over 6 glucose unit polydextrose) 50.6 wt %; DP5 11.4 wt %; DP4 9.6 wt %; DP3 7.6 wt %; DP2 7.0 wt %; glucose 6.4 wt %; sorbitol 2.8 wt %; anhydroglucose 3.9 wt %; citric acid 0.7 wt %. The highly pure, water-soluble polydextrose separated by this example has a composition consisting of over DP6 50.9 wt %; DP5 11.5 wt %; DP4 9.7 wt %; DP3 7.7 wt %; DP2 7.1 wt %; glucose 6.5 wt %; sorbitol 2.6 wt %; anhydroglucose 3.9 wt %; citric acid 0.1 wt % as component A. As component B, the mixture has a composition consisting of glucose 0.2 wt %; anhydroglucose 0.3 wt %; sorbitol 16.5 wt %; citric acid 83.0 wt %.

As a result of this separation, highly pure, water-soluble polydextrose is obtained, and it is concentrated and dried to obtain the highly pure, water-soluble polydextrose powder. The highly pure, water-soluble polydextrose obtained in this example removes sour taste of water-soluble polydextrose.

EXAMPLE 3

The separation method for removing glucose and anhydroglucose selectively in the crude polydextrose mixture.

In order to remove only glucose and anhydroglucose selectively from the crude polydextrose mixture, the amount of feed solution is designed to 10.0 vol % per one column resin amount and the amount of desorbent water is designed to 18.0 vol % per one column resin amount. Then, component A is discharged in an amount of 22.9 vol % per one column resin amount, and component B (glucose and anhydroglucose) is discharged in an amount of 5.1 vol % per one column resin amount.

Component A and component B are discharged simultaneously, since the void volume of the resin and pipe are already filled with fluid. After finishing the discharge of component A, 38.8 vol % of 1 column volume of resin is circulated. The total time required for 1 cycle (4 steps of operation) is 58.96 minutes on condition that linear velocity is 2.5 m/L-R/Hr.

The equipment for separating process in this example is the same as the equipment of example 1.

The first step is to feed 22.7 L of desorbent water into No. 4 by passing through No. 3, and the same amount of component A (22.7 L of highly pure polydextrose) is discharged in No. 2. The second step is to feed 35.2 L of feed solution into No. 2 column and to feed 18 L of desorbent water into No. 4 and 35.2 L of component A is discharged from No. 2 togeher with discharging of 18 L of component B (glucose and anhydroglucose) from No. 4. The third step is to feed 22.7 L of desorbent water into No. 4 by passing through No. 3, and 22.7 L of component A is discharged from No. 2. The fourth step is to circulate the fluid in the columns in total volume of 136 L for 9.26 minutes. First step of operation is finished as above, and it requires 14.74 minutes for first step of operation.

The second step of operation, third step of operation and the fourth step of operation are as the same manner of first step of operation, only moving the feeding and discharging to the next columns. Therefore, it requires 58.96 minutes for total 4 steps of operation.

The crude polydextrose mixture used for feed solution of this example has the composition consisting of over DP6 (over 6 glucose unit polydextrose) 50.6 wt %; DP5 11.4 wt %; DP4 9.6 wt %; DP3 7.6 wt %; DP2 7.0 wt %; glucose 6.4 wt %; sorbitol 2.8 wt %; anhydroglucose 3.9 wt %; citric acid 0.7 wt %. The highly pure, water-soluble polyldextrose separated by this example has a composition consisting of over DP6 56.5 wt %; DP5 12.7 wt %; DP4 10.7 wt %; DP3 8.5 wt %; DP2 7.8 wt %; glucose 0.006 wt %; sorbitol 3.1 wt %; anhydroglucose 0.004 wt %; citric acid 0.7 wt % as component A. As component B, the mixture has a composition consisting of glucose 62.1 wt %; anhydroglucose 37.9 wt %.

As a result of this separation, highly pure, water-soluble polydextrose is obtained, and it is concentrated and dried to obtain the highly pure, water-soluble polydextrose powder. The highly pure, water-soluble polydextrose obtained in this example removes bitter taste of water-soluble polydextrose.

EXAMPLE 4

The separation method for removing anhydroglucose selectively in the crude polydextrose mixture.

In order to remove only anhydroglucose selectively from the crude polydextrose mixture, the amount of feed solution is designed to 10.5 vol % per one column resin amount and the amount of desorbent water is designed to 17.5 vol % per one column resin amount. Then, component A is discharged in an amount of 26.6 vol % per one column resin amount, and component B (citric acid) is discharged in an amount of 1.42 vol % per one column resin amount.

Component A and component B are discharged simultaneously, since the void volume of the resin and pipe are already filled with fluid. After finishing the discharge of component A, 38.4 vol % of 1 column volume of resin is circulated. The total time required for 1 cycle (4 steps of operation) is 62.28 minutes on condition that linear velocity is 2.5 m/L-R/Hr.

The equipment for separating process in this example is the same as the equipment of example 1.

The first step is to feed 28.3 L of desorbent water into No. 4 by passing through No. 3, and the same amount of component A (28.3 L of highly pure polydextrose) is discharged in No. 2. The second step is to feed 36.8 L of feed solution into No. 2 column and to feed 5.0 L of desorbent water into No. 4, and 36.8 L of component A is discharged from No. 2 together with discharging of 5.0 L of component B (anhydroglucose) from No. 4. The third step is to feed 28.3 L of desorbent water into No.4 by passing through No. 3, and 28.3 L of component A is discharged from No. 2. The fourth step is to circulate the fluid in the columns in total volume of 135.2 L for 9.21 minutes. First step of operation is finished as above, and it requires 15.57 minutes for first step of operation.

The second step of operation, third step of operation and the fourth step of operation are performed as the same manner of first step of operation, only moving the feeding and discharging to the next columns. Therefore, it requires 62.28 minutes for total 4 steps of operation.

The crude polydextrose mixture used for feed solution of this example has the composition consisting of over DP6 (over 6 glucose unit polydextrose) 50.6 wt %; DP5 11.4 wt %; DP4 9.6 wt %; DP3 7.6 wt %; DP2 7.0 wt %; glucose 6.4 wt %; sorbitol 2.8 wt %; anhydroglucose 3.9 wt %; citric acid 0.7 wt %. The highly pure, water-soluble polydextrose separated by this example has a composition consisting of over DP6 52.7 wt %; DP5 11.9 wt %; DP4 10.0 wt %; DP3 7.9 wt %; DP2 7.3 wt %; glucose 6.6 wt %; sorbitol 2.9 wt %; anhydroglucose 0.002 wt %; citric acid 0.7 wt % as component A. As component B, the mixture has a composition consisting of glucose 1.0 wt %; anhydroglucose 97.2 wt %; sorbitol 1.0 wt %; citric acid 0.8 wt %.

As a result of this separation, highly pure, water-soluble polydextrose is obtained, and it is concentrated and dried to obtain the highly pure, water-soluble polydextrose powder. The highly pure, water-soluble polydextrose obtained in this example removes bitter taste of water-soluble polydextrose.

We claim:

1. A process for obtaining, by separation, over 99.2% pure, water-soluble polydextrose from a crude polydextrose mixture comprising 75~95 wt % of polyglucose, 2~10 wt % of glucose, 2~10 wt % of anhydroglucose, 1~5 wt % of sorbitol, 0.5~3 wt % of citric acid using a continuous simulated moving bed system, said process comprising the steps of:

a) dissolving said crude polydextrose mixture with distilled water to be 45~50 wt % of dry substance concentration at 55°~65° C. to produce a crude polydextrose solution;

b) feeding and circulating said crude polydextrose solution with desorbent water through means compacted with a strong acidic gel form of ion resin having $Na^+$ as a functional group, 4~8% of cross-linkage and a particle size of about 180–250 μm;

c) separating and collecting the glucose, anhydroglucose, sorbitol and/or citric acid selectively using the difference of distribution coefficient; and d) collecting the over 99.2% pure, water-soluble polydextrose.

2. The process according to claim 1, wherein glucose, anhydroglucose, sorbitol and/or citric acid are separated and removed by the difference of linear velocity lower than 4.71 m/Hr on condition that a linear velocity of mobile phase is 2.5 m/Hr.

3. The process according to claim 1, wherein the ion resin is selected from the group consisting of Amberlite CG 6000, DIAION UBK-530K, Dowex M 4340 6X, PCR-833 and FRK 101 having a $Na^+$ functional group.

* * * * *